(No Model.)
W. ROADHOUSE.
METALLIC PACKING FOR PISTON RODS.
No. 449,949. Patented Apr. 7, 1891.
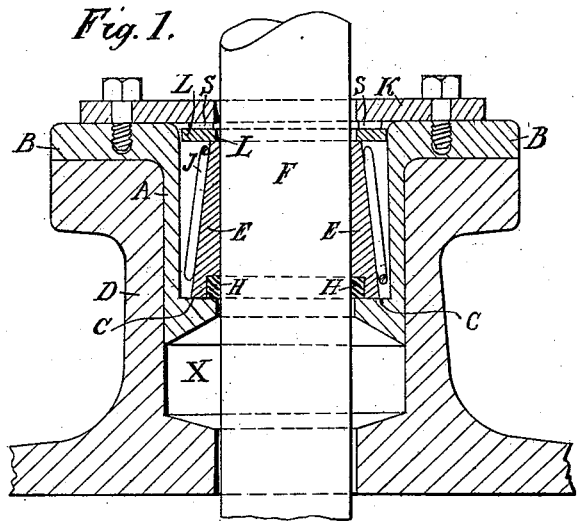
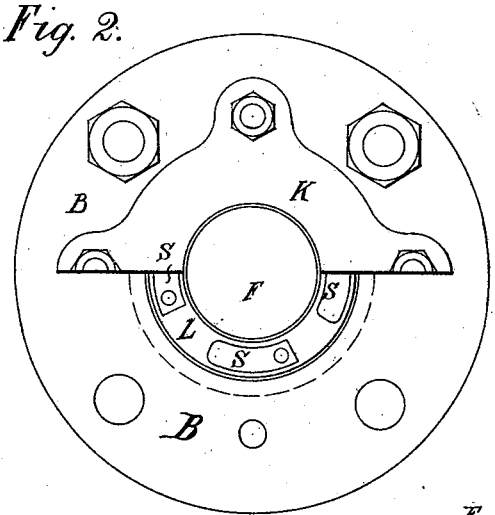
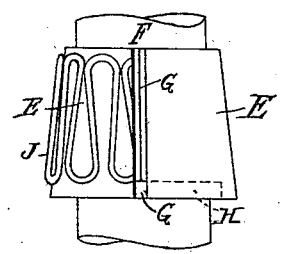
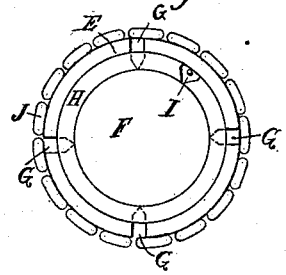
Witnesses.
Rob. F. Drury
Ensor D. Drury
Inventor.
William Roadhouse

UNITED STATES PATENT OFFICE.

WILLIAM ROADHOUSE, OF SHEFFIELD, ENGLAND, ASSIGNOR TO SYDNEY ASLINE WARD, OF SAME PLACE.

METALLIC PACKING FOR PISTON-RODS.

SPECIFICATION forming part of Letters Patent No. 449,949, dated April 7, 1891.

Application filed November 30, 1889. Serial No. 332,089. (No model.) Patented in England February 18, 1889, No. 2,818.

*To all whom it may concern:*

Be it known that I, WILLIAM ROADHOUSE, a subject of the Queen of Great Britain, residing at Sheffield, in the county of York, England, have invented certain new and useful Improvements in Metallic Packings for Piston-Rods and other Similar Rods, (patented to me in England by Letters Patent No. 2,818, dated February 18, 1889;) and I do hereby declare that the following is a full, clear, and exact description thereof, reference being had to the accompanying drawings, which form a part of this specification.

The object of this invention is to construct an effective steam-tight metallic packing of few parts and of great durability, suitable for piston-rods and other like rods, adapted to be practically inclosed as a whole within an ordinary stuffing-box and to be readily fitted and applied to existing engines.

The invention consists in a certain novel combination of parts hereinafter claimed.

The annexed drawings represent an improved packing made according to my invention, and similar letters refer to similar parts throughout the several views.

Figure 1 is a vertical section of packing with gland as applied to an ordinary stuffing-box; Fig. 2, a plan of same with part of top plate removed; Fig. 3, an elevation of packing, half being without spring; Fig. 4, a plan of under side of packing; Fig. 5, an edge view of spring-washer; Fig. 6, a diametric section and plan of a spring-washer of an alternative construction.

For convenience and clearness the parts will be referred to as above in the positions in which they appear in Fig. 1.

In the construction of a packing according to this invention for the stuffing-box of a piston-rod, and as shown in the drawings, I make a removable lining sleeve or gland A, having a circumferential flange B and an internal shoulder C and fitting into the stuffing-box D on cylinder-cover. The gland has a concave end surface opposed to the concave bottom of the stuffing-box D, so that the space X between the two may be packed with hemp or the like in an emergency until new metallic packings can be obtained. The gland also facilitates applying the packing to existing engines, as in connection therewith the packing proper, hereinafter termed "the packing," need not be fitted to the stuffing-box, and the gland need only be fitted as to diameter to its cylindrical portion. The face of the internal shoulder C is made perfectly true for the end face of the packing to rest upon. The main portion F of the packing is made in the form of a collar fitting closely upon the piston-rod F, the outside being tapered for convenience in putting on the spring J, hereinafter more particularly described. I divide each collar-packing E into any desired number of sections by cuts or divisions G, Figs. 3 and 4, made either diagonally or in line with its longitudinal axis. The one shown is divided in this manner into four sections. (See Fig. 4.) I prefer to make the dividing-cuts of such a form that each section will have two projecting angular edges next to the piston-rod, each edge being contiguous to that of the next section. By this simple means the sections are not only retained in their relative positions, but are enabled to close upon the piston-rod as their inner face is worn away; but this configuration is not essential to the invention. A glut-ring H, of any suitable cross-section, having a single cut I, Fig. 4, is let into a corresponding recess or groove in the end face of the collar-packing E, so as to form part of the end face of the packing as a whole. Its single cut is preferably of the form above described, as shown in Fig. 4, and only destroys its rigidity to a sufficient extent to adapt it to contract with the collar-packing as wear occurs. The said collar-packing and glut-ring are held tightly to the piston-rod by means of an encircling spring J, preferably of wire in open fakes, as shown, (but other forms may be substituted, such as one or more rings of flat clock-spring,) and they are pressed firmly down upon the face of the shoulder C by the cover-plate K acting against an intermediate spring-washer L. This spring-washer may be in the form of a flat ring, having a number of springs S fixed upon it, which are compressed when the cover-plate is screwed down, holding the sections of the collar-packing and the cut glut-ring with an elastic pressure against the face of the shoulder C. The spring-washer may alternatively be made of elastic material, having a U-shaped cross-section, the opening being toward the center, as shown at L², Fig. 6, and dispensing with separate springs. The glut-ring prevents the passage of steam and the collar-packing gives the required support and wearing-surface.

Having now described my said invention, I declare that what I desire to claim and secure by Letters Patent of the United States is—

The combination, with an ordinary stuffing-box, of the gland A, having the circumferential flange B and internal shoulder C at its outer and inner ends, respectively, the collar-packing E, the glut-ring H let into the end face of said collar-packing, a spring-washer at the opposite end of said collar-packing, whereby said end face and glut-ring are pressed against said shoulder, an encircling spring whereby said collar-packing and glut-ring are held tightly to the rod, and a cover-plate bolted to the outer end of the gland and serving as an abutment for said spring-washer, substantially as shown and described.

In testimony that I claim the foregoing as my own I have affixed hereto my signature, in presence of two witnesses, this 2d day of November, 1889.

WILLIAM ROADHOUSE.

Witnesses:
ROBT. F. DRURY,
ENSOR D. DRURY.